United States Patent [19]
Gupta et al.

[11] Patent Number: 5,931,622
[45] Date of Patent: Aug. 3, 1999

[54] FASTENER ASSEMBLY WITH LATERAL END EXTENSION

[75] Inventors: Harish C. Gupta, Naperville; Richard J. Ernst, Palatine, both of Ill.

[73] Assignee: Illinois Tool Works Inc., Glenview, Ill.

[21] Appl. No.: 09/047,612

[22] Filed: Mar. 25, 1998

Related U.S. Application Data

[63] Continuation-in-part of application No. 08/946,319, Oct. 7, 1997.

[51] Int. Cl.⁶ .............................. F16B 15/08; F16B 39/00
[52] U.S. Cl. ........................... 411/443; 411/966; 206/345
[58] Field of Search .................................. 411/441, 442, 411/443, 444, 966; 206/345–347

[56] References Cited

U.S. PATENT DOCUMENTS

| | | | |
|---|---|---|---|
| 3,294,303 | 12/1966 | Anstett | 227/95 |
| 3,358,822 | 12/1967 | O'Connor | 206/56 |
| 3,491,389 | 1/1970 | Leistner . | |
| 3,736,198 | 5/1973 | Leistner | 156/65 |
| 3,756,391 | 9/1973 | Keck et al. | 206/56 |
| 3,927,459 | 12/1975 | Haytayan et al. | 29/413 |
| 3,944,067 | 3/1976 | Bakoledis | 206/347 |
| 3,954,176 | 5/1976 | Haytayan | 206/347 |
| 4,047,611 | 9/1977 | Damratowski | 206/347 |
| 4,106,618 | 8/1978 | Haytayan | 206/343 |
| 4,298,121 | 11/1981 | Oida et al. | 206/347 |
| 4,343,579 | 8/1982 | Shelton et al. | 411/442 |
| 4,483,280 | 11/1984 | Nikolich | 123/46 |
| 4,522,162 | 6/1985 | Nikolich | 123/46.5 |
| 4,718,551 | 1/1988 | Whitledge | 206/347 |
| 4,836,372 | 6/1989 | Shelton | 206/344 |
| 4,881,643 | 11/1989 | Pfister | 206/343 |
| 4,932,821 | 6/1990 | Steffen et al. | 411/442 |
| 5,005,699 | 4/1991 | Kawashima et al. | 206/344 |
| 5,046,396 | 9/1991 | Pfister | 411/442 X |
| 5,069,340 | 12/1991 | Ernst et al. | 206/347 |
| 5,443,345 | 8/1995 | Gupta | 411/442 X |
| 5,713,709 | 2/1998 | Huang | 411/442 |

FOREIGN PATENT DOCUMENTS

| | | | |
|---|---|---|---|
| 0 297 156 | 1/1989 | European Pat. Off. | B25C 1/04 |

*Primary Examiner*—Neill Wilson
*Attorney, Agent, or Firm*—Pauley Petersen Kinne & Fejer

[57] ABSTRACT

The present invention is a fastener assembly including a row of fasteners maintained in position by a carrier. The carrier includes a plurality of adjacent sleeves, each of which includes an upper breakable portion, a middle wall portion, and a lower breakable portion. When a fastener is driven into a work piece, the upper and middle portions of the fastener sleeve break away and the lower portion breaks into fragments, so that no residual sleeve parts remain with the fastener. This is accomplished by forming the carrier from a mixture of a stiff polyolefin material and a particulate filler to impart the necessary brittleness to the carrier sleeves. The plurality of carrier sleeves include two end sleeves. At least one end sleeve includes a lateral end extension in the lower breakable portion which helps to balance and stabilize the fastener assembly in the shear block and magazine holder of a fastener driving tool.

32 Claims, 6 Drawing Sheets

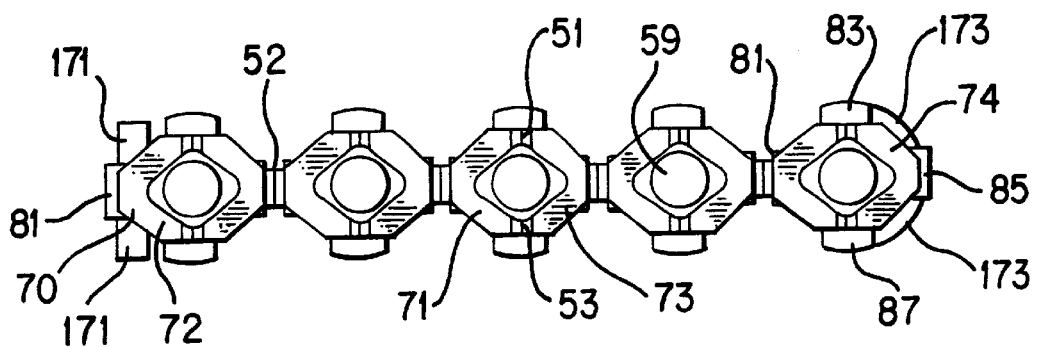
FIG. 11
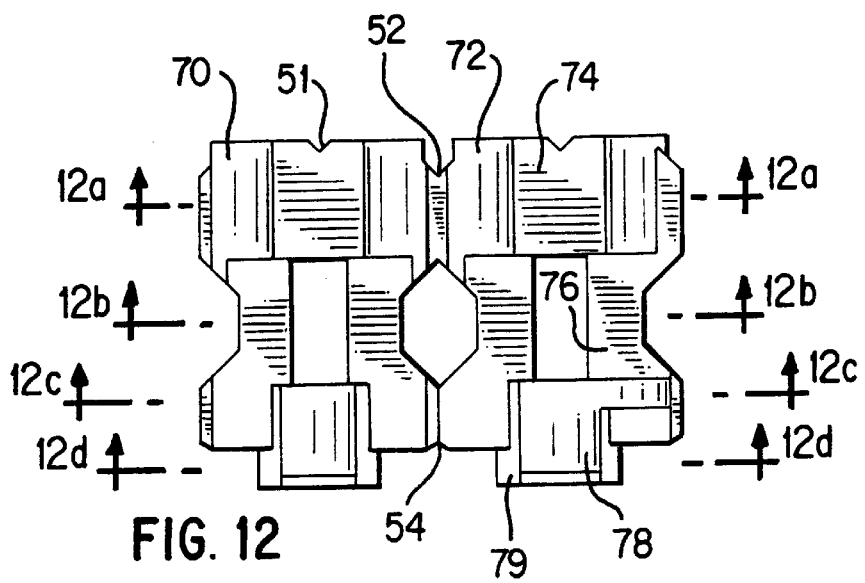
FIG. 12
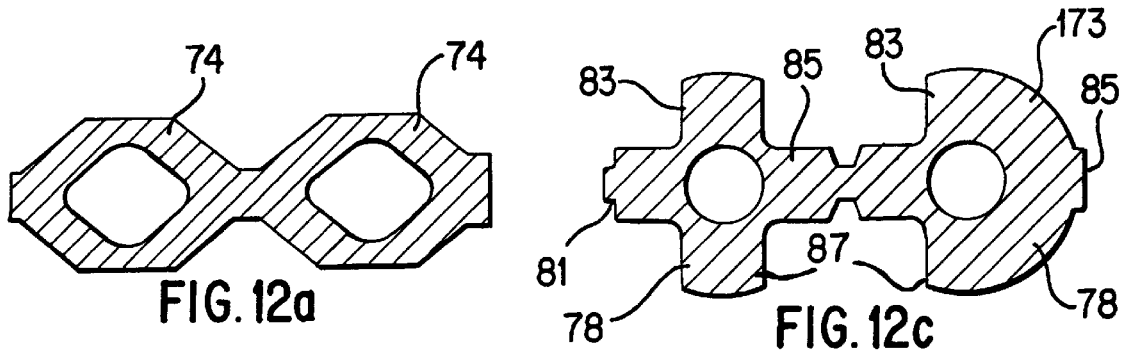
FIG. 12a
FIG. 12c
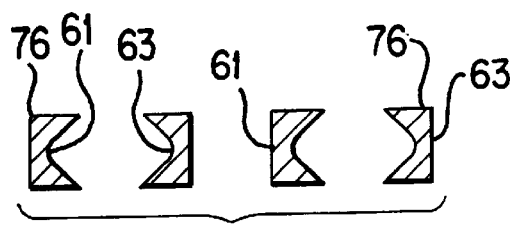
FIG. 12b
FIG. 12d

FASTENER ASSEMBLY WITH LATERAL END EXTENSION

RELATED APPLICATIONS

This application is a continuation-in-part of U.S. application Ser. No. 08/946,319, filed on Oct. 07, 1997.

FIELD OF THE INVENTION

This invention is an improved fastener assembly of the type where fasteners such as nails are maintained in rows or strips useful in nail guns and other fastener driving tools. More particularly, the invention is a fastener assembly which utilizes a novel carrier design and an improved carrier material for maintaining the fasteners in position.

BACKGROUND OF THE INVENTION

Fast-acting fastener driving tools are commonplace in the building industry. Fasteners, such as nails or concrete or steel penetrating pins, are assembled in rows or strips that are adapted for use in the driving tools. The strips are typically essentially flat so that the fasteners are maintained in position parallel to each other.

One way to maintain the fasteners in position is described in U.S. Pat. No. 5,069,340, issued to Ernst et al., the disclosure of which is incorporated by reference. As explained in the reference, a plurality of collated fasteners, each having a shank and a head, is maintained in parallel relationship using a carrier molded from a polymeric material which can be polypropylene. The carrier includes a sleeve associated with each fastener.

A representative prior art fastener assembly is illustrated in FIG. 9, which shows a strip 10 of collated fasteners 12 (one of which is shown), held together by a carrier 30. Each fastener 12 is a drive pin, made from hardened steel, and is designed to be forcibly driven through a work piece, such as a galvanized steel channel or track, and into a substrate which can be made of concrete or steel. Each fastener 12 has an elongated shank 18 with a pointed end 20, and a head 22.

The polypropylene carrier 30 has a separate sleeve 32 for each fastener 12. Each sleeve 32 includes a lower annular portion 34 and an upper breakable portion 36 which is integral with the annular portion 34. Each sleeve 32 grips the shank 18 of the associated fastener 12, with the annular portion 34 nearer to the pointed end 20 of the shank 18, and with the breakable portion 36 nearer to the head 22.

In each sleeve 32, the breakable portion 36 has a pair of similar, laterally opposed, outwardly opening concave recesses 40 and 42. Between each pair of sleeves 32, an upper bridge 44 and lower bridge 46 are located, which hold the adjacent sleeves together. During operation, the entire fastener assembly 10 is placed in the magazine portion of the power driving tool. The power driving tool acts forcefully on the head 22 of the first fastener 12, driving it downward. The force causes the bridges 44 and 46 to break between the first and second sleeves 32, so that the first sleeve 32 separates from the carrier 30.

As the first fastener 12 is driven downward into an object, the upper breakable portion 36 of the first sleeve 32 ruptures at the recesses 40 and 42 and splits longitudinally into two halves as the fastener 12 enters the object. However, the splitting usually does not extend to the lower annular portion 34 of the sleeve 32, and the annular portion 34 remains compressed between the head 22 of the fastener 12 and the object into which the fastener 12 is driven. Furthermore, the two halves of the upper (split) portion of the sleeve 32 usually remain integrally connected to the annular portion 34 and protrude outward from the object as "tails." This is more fully described in U.S. Pat. No. 5,069,340, the disclosure of which is incorporated herein by reference.

Because the surface into which the fasteners are driven is often hidden, the outward protrusion of "tails" does not present an aesthetic problem in many applications. However, there are some applications where aesthetics are important, or where an outer coating or object is to be placed directly on the substrate. These latter applications generate a need or desire for fastener assemblies which do not generate outwardly protruding tails, or other residual fastener sleeve parts.

SUMMARY OF THE INVENTION

The present invention is a fastener assembly in which the carrier is sufficiently strong and rigid to maintain the fasteners in position, yet in which the individual sleeves of the carrier will break in a manner when the fastener is driven into an object so as not to leave outwardly protruding tails, or other residual sleeve parts. The invention includes both a novel carrier design and an improved material composition for the carrier.

The fastener assembly includes a row of collated fasteners held together in a strip by a carrier. Each fastener has a head portion and an elongated shank. The carrier includes a separate sleeve for each fastener, and the adjacent sleeves are held together with bridges.

Each carrier sleeve includes an upper breakable portion and a lower breakable portion which is integral with the upper portion. The upper breakable portion and lower breakable portion each extend completely around the circumference of the shank portion of the fastener. The upper breakable portion also has a pair of similar, laterally opposed, outwardly opening concave recesses which facilitate splitting of the upper breakable portion when a driving force is applied to the head of the fastener, forcing the fastener into an object.

In order to facilitate the complete fragmentation of the fastener sleeve when the upper portion is split, the upper portion and lower portion are joined by a pair of middle sidewalls which, unlike the upper and lower portions, do not extend completely around the circumference of the shank and which, at their narrowest points, cover less than two thirds of the circumference of the shank. This design ensures that the middle sidewalls will be structurally weaker than the upper and lower portions, so that the walls will break more or less horizontally when the upper portion is split, before the lower portion fragments, as explained below.

In order to facilitate subsequent fragmentation of the lower portion, the lower portion includes a plurality of laterally protruding tabs joined by structurally weaker junctions. The tabs help align the lower portion with the object into which the fastener is driven. When the fastener is driven into the object, the lower portion breaks apart at the junctions between the tabs, so that no residual fastener is left behind at the point of entry of the fastener into the object.

In order to further ensure that the middle walls will break and not merely bend, and the lower portion will fragment, the carrier is molded from a rigid composition which comprises a stiff polyolefin mixed with about 1–20% by weight of a particulate filler. The particulate filler causes the already stiff polyolefin to become hard and brittle, so that the carrier walls will not substantially bend before breaking, and the lower portion will break rather than compress. By ensuring that the walls will break, and the lower portion will fragment, the problem of tails and other residual fastener sleeve resulting from the driving of the fastener into an object is eliminated.

In order to help stabilize the fastener assembly in the carrier magazine of a driving tool, the first and (preferably) last sleeves of the collation have a lateral extension on the lower portions of the sleeves, and on the outboard ends of the sleeves. The lateral end extension engages ribs in the shearing block of the driving tool, to help prevent rocking of the fastener assembly when the fasteners are being fired through the driving tool. In particular, the lateral end extension helps prevent rocking of the fastener assembly when the last one or two fasteners are all that remain in the collation, and are being fired from the driving tool. The lateral end extension is preferably formed on the sleeves at both ends of the collation, so that the collation is symmetrical and either end may be installed first in the carrier magazine of the driving tool. The lateral end extension may be arcuate to facilitate ease of molding, or may have another (for example, tubular) configuration.

With the foregoing in mind, it is a feature and advantage of the invention to provide a fastener assembly in which the upper portions of the carrier sleeves break away from the lower portions when the fasteners are driven into an object, and the lower portions then break into fragments.

It is also a feature and advantage of the invention to provide a fastener assembly that is sufficiently durable and tough to keep the fasteners collated during shipping and handling, which allows the fasteners to be stripped off individually, and whose carrier sleeves will disintegrate when the fasteners enter the workpiece.

It is also a feature and advantage of the invention to provide a fastener assembly whose carrier is made from a stiff polyolefin mixed with a particulate inorganic filler, causing the carrier to be relatively hard, brittle and inflexible.

It is also a feature and advantage of the invention to provide a fastener assembly which has improved balance and stability, and exhibits little or no rocking in the driving tool, when only one or a few fasteners remain in the assembly and are being fired from the driving tool.

The foregoing and other features and advantages will become further apparent from the following detailed description of the presently preferred embodiments, read in conjunction with the accompanying drawings. The detailed description and drawings are intended to be illustrative rather than limiting, the scope of the invention being defined by the appended claims and equivalents thereof.

BRIEF DESCRIPTION OF THE DRAWINGS

FIG. 11 is a top plan view of a carrier component of the fastener assembly of the invention, having lateral end extensions on both end sleeves. One embodiment of a lateral end extension is shown on the left hand side, while another embodiment is shown on the right hand side.

FIG. 12 is a front view of the last two carrier sleeves in the carrier assembly of FIG. 11.

FIG. 12a is a sectional view taken along the line a—a in FIG. 12.

FIG. 12b is a sectional view taken along the line b—b in FIG. 12.

FIG. 12c is a sectional view taken along the line c—c in FIG. 12.

FIG. 12d is a sectional view taken along the line d—d in FIG. 12.

DETAILED DESCRIPTION OF THE PRESENTLY PREFERRED EMBODIMENTS

Figure 1:
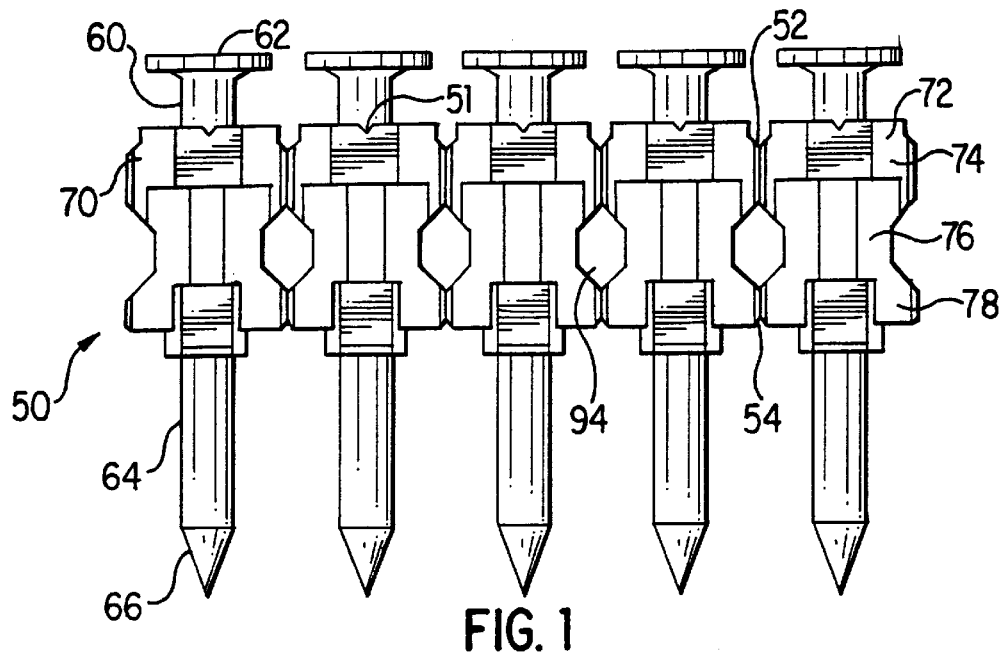
FIG. 1 is a front view of a fastener assembly of the invention, showing the fasteners inside the carrier sleeves, and showing only five fasteners and fastener sleeves for the sake of illustration. A typical fastener assembly of the invention may contain 10 fasteners or more arranged in similar fashion.

Referring to FIG. 1, a fastener assembly, generally designated as 50, includes a row of hardened steel fasteners 60 held in parallel relationship by a carrier 70. Each fastener 60 includes a head 62 and an elongated shank 64 with a pointed end 66. The carrier 70 is made of a rigid filled polyolefin material as described below. The fastener assembly 50 is used in the magazine of a power driving tool such as a fast-acting nail gun. One example of a power driving tool is a TrakFast® tool, which is commonly used to connect steel channels or "tracks" to concrete substrates, and for other construction applications. The fastener assembly 50 may include 10–20 fasteners or more, arranged in substantially parallel relationship as illustrated.

Figure 4:
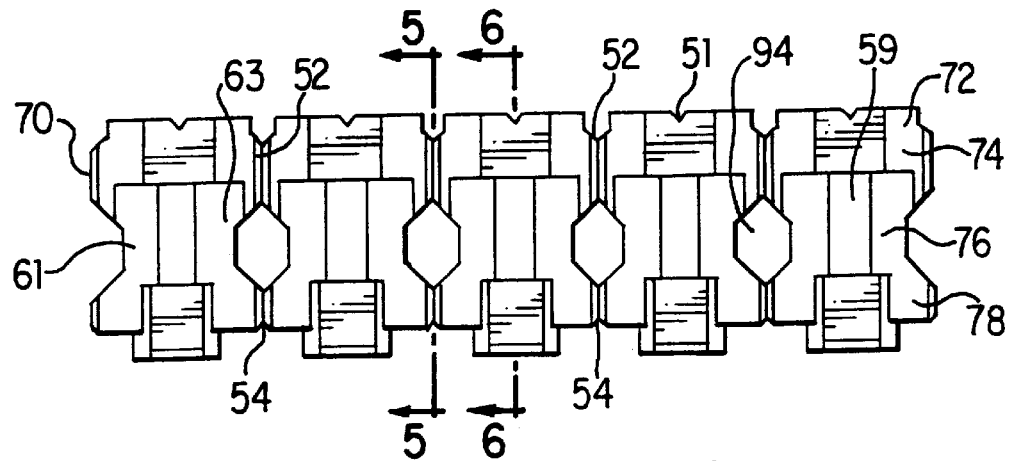
FIG. 4 is a front view of the carrier component of the fastener assembly.

The carrier 70 includes a plurality of carrier sleeves 72, one for receiving and surrounding the shank 64 of each fastener 60. Each adjacent pair of carrier sleeves 72 is joined together by an upper bridge 52 and a lower bridge 54, which are integrally molded with the carrier 70. As seen in FIGS. 1 and 4, the lower bridge 54 is preferably smaller than the upper bridge 52. This helps to ensure that the bridge 54 breaks more easily than the lower breakable portion of the fastener sleeve, as explained below.

The bridges 52 and 54 must be strong enough to hold the adjacent carrier sleeves 72 together prior to and during loading into the power driving tool, and during use in the magazine of the driving tool. In this regard, the bridges must keep the row of sleeves 72 from bending, buckling, breaking or shearing during ordinary handling and use. However, the bridges 52 and 54 must readily shear when the driving mechanism of the power tool applies a rapid downward force on the head 62 of the leading fastener 60, causing the leading fastener 60 with its sleeve 72 to separate from the fastener assembly 50, so that the leading fastener 60 can be driven into an object.

A certain balance must be considered when designing the size, shape, thickness and material of bridges 52 and 54. If the force required to shear the bridges is too low, the bridges may shear or break prematurely during handling and use of the fastener assembly 50. If the force required to shear the bridges is unnecessarily high, then the energy requirements for the power driving tool will increase, and its operation will be slowed or the penetration of the fasteners in the substrate will be reduced. Therefore, the bridges should be just strong enough to maintain the sleeves 72 in position during normal handling and use before each leading fastener 60 is driven into an object.

Figure 3:
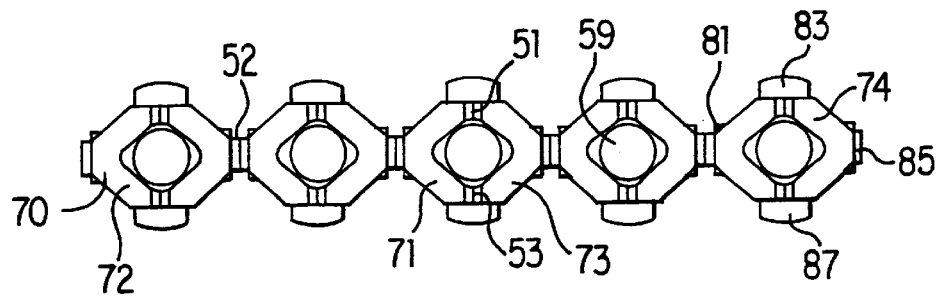
FIG. 3 is a top plan view of the carrier component of the fastener assembly.
Figure 8:
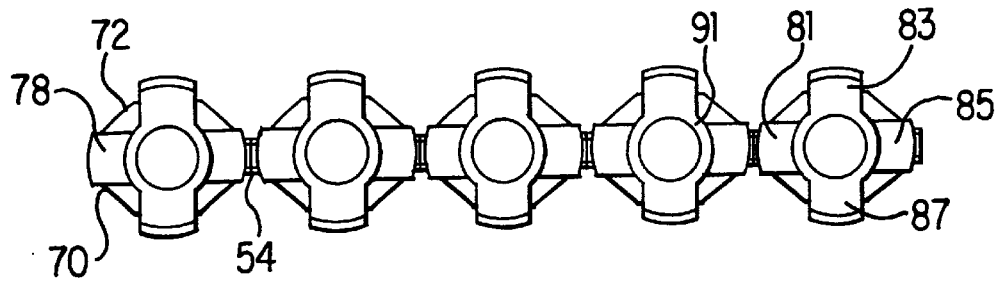
FIG. 8 is a bottom plan view of the carrier component of the fastener assembly.
Figure 9:
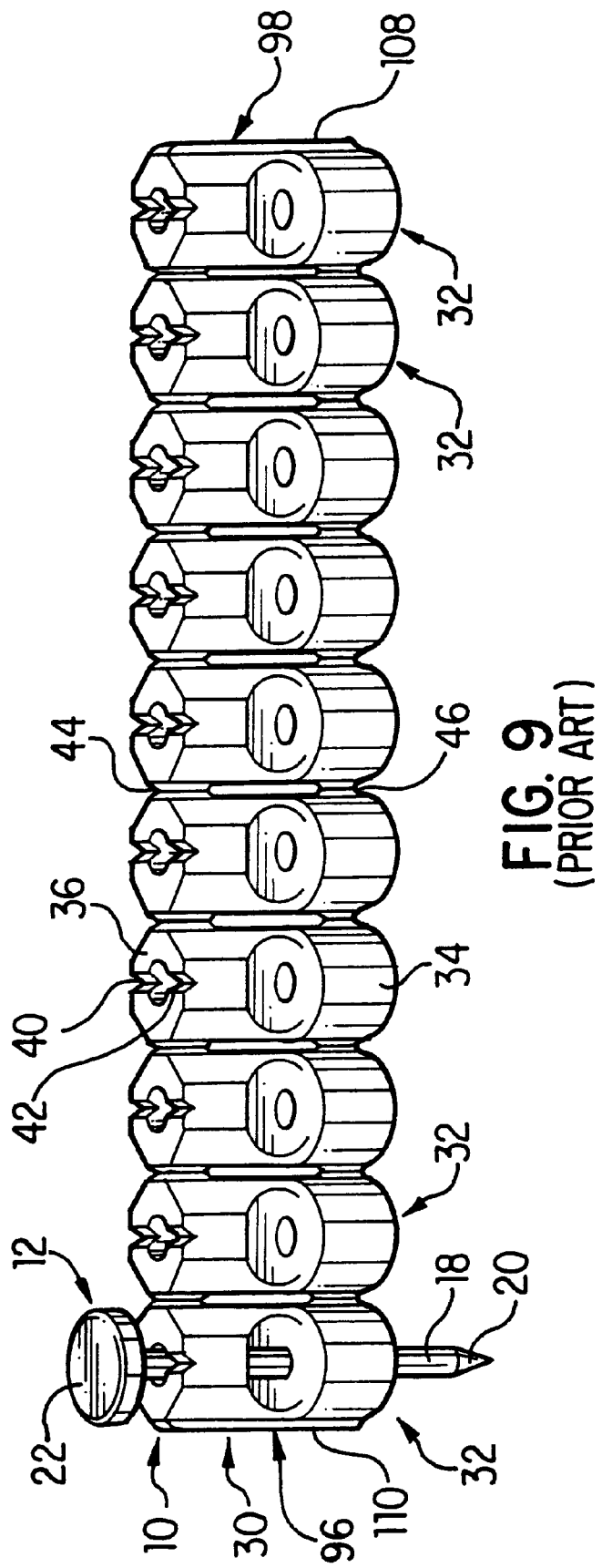
FIG. 9 is a perspective view of a prior art fastener assembly disclosed in U.S. Pat. No. 5,069,340, issued to Ernst et al.

Furthermore, the bridges 52 and 54 should not be so strong that they cannot be sheared without otherwise breaking the adjacent sleeves 72. As shown in FIG. 4, for instance, it is especially preferred that the height of the lower bridge 54 be less than the adjacent thickness of the sleeve 72 surrounding the fastener 60. As shown in FIGS. 3 and 8, the thickness of the bridges 52 and 54 should also be smaller than the adjacent thicknesses of the sleeves 72.

Each carrier sleeve 72 is preferably integrally formed and includes an upper breakable collar 74, a middle wall portion 76, and a lower breakable collar 78. As shown in FIG. 3, the upper breakable collar 74 includes two halves 71 and 73 intersecting and joined at a pair of similar, laterally opposed, outwardly opening concave recesses or indentations 51 and 53. The recesses 51 and 53 facilitate breakage of the carrier sleeve 72 as the fastener 60 is driven downward into a channel or track.

Figure 2:
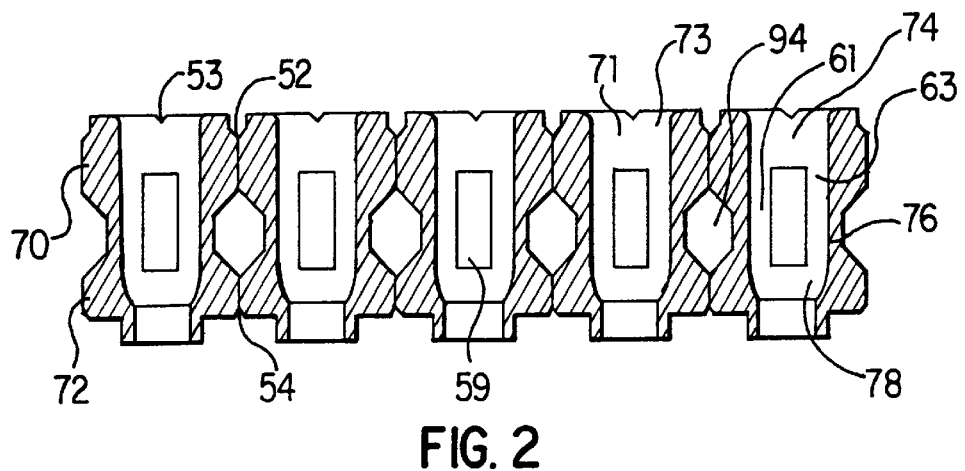
FIG. 2 is a front sectional view of only the carrier component of the fastener assembly, without the fasteners.

As shown in FIG. 3, the upper breakable collar 74 of the sleeve 72 has a generally annular interior cross-section corresponding substantially to the outer diameter of the shank 64 of the fastener 60, and an octagonal exterior cross-section which complements the interior dimensions of the magazine and which also facilitates proper breakage as explained below. The interior diameter of the upper breakable collar 74 (as well as of the lower breakable collar 78) of the sleeve 72 should be sufficient to slidably receive the shank 64 in a tight-fitting manner. The carrier 70 is integrally manufactured (e.g., molded) separate from the fasteners, and it must be possible to insert the fasteners 60 into the sleeves 72 without undue difficulty. On the other hand, the fit between fasteners 60 and sleeves 72 should not be loose enough to permit the fasteners 60 to fall out of the sleeves, or become misaligned. Preferably, the upper collar 74 is longer and thicker than the lower collar 78, as illustrated in FIG. 2. This facilitates even and clean breakage of the sleeve 72 during installation of a pin 60 into a substrate.

Figure 5:
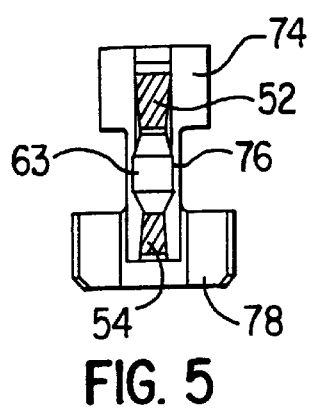
FIG. 5 is a side sectional view taken along the line 5—5 in FIG. 4.
Figure 6:
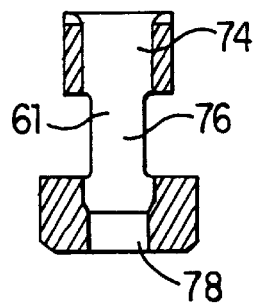
FIG. 6 is a side sectional view taken along the line 6—6 in FIG. 4.
Figure 7:
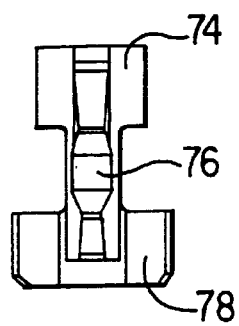
FIG. 7 is a side view of the carrier shown in FIG. 4.

Referring to FIGS. 2 and 4–7, the middle portion 76 includes two walls 61 and 63 which, unlike the upper collar 74 and lower collar 78, do not completely surround the shank 64 of the fastener 60. As shown in FIGS. 5–7, the walls each have two concave rectangular boundaries defining rectangular openings 59 between the upper collar 74 and the lower collar 78 of each sleeve 72. In the region of the rectangular openings 59, the walls 61 and 63 cover less than two-thirds of the outer circumference of the fastener shank 64, preferably less than one-half, most preferably about one-third. As explained further below, the advantage of having middle walls 61 and 63 which only partially surround the corresponding shank 64, is that this facilitates lateral breakage of the sleeve 72 when the upper collar 74 is split.

In the preferred embodiment shown in the drawings, the middle walls 61 and 63 are the result of forming each carrier sleeve 72 with two rectangular center openings 59. The rectangular openings 59 preferably have sharp corners which create areas of high concentration of stress to facilitate breakage when the pin enters the substrate. The middle walls 61 and 63 are made even thinner by forming hexagonal openings 94 between adjacent sleeves 72, and between the upper and lower bridges 52 and 54. This saves material and further aids in the breakage of the sleeve 72 when the fastener 60 is driven. Other methods for forming the middle walls, and other configurations of the walls, are within the scope of this invention, as would be apparent to persons skilled in the art.

Referring to FIGS. 3 and 8, the lower breakable collar 78 of each sleeve 72 has an annular interior cross-section which slidably grips the fastener shank 64 in the same fashion as the annular interior of the upper collar 74. The outer cross-section of the lower collar 78 is shaped like a cross, as shown in FIG. 8, due to the presence of four fragmentable tabs 81, 83, 85 and 87. The tabs are preferably offset as shown in FIGS. 4 and 8, for instance, so that two of the tabs 83 and 87 extend below the other two tabs 81 and 85. The offsetting of the tabs facilitates moldability of the sleeve 72 during manufacture, and breakage of the sleeve 72 during installation of the pin 60 into an object. The tabs 81, 83, 85 and 87 constitute substantially the entire lower collar 78. As shown in FIG. 4, the fragmentable tabs have a height or thickness extending from about the bottom of the lower collar 78 up to the lower boundary of the rectangular openings 59 which help define the walls 61 and 63 of the middle portion 76. As shown in FIG. 8, the tabs are joined by a circular wall 91 which is structurally thinner and weaker than the tabs, so that the lower collar 78 fragments by breaking of the wall 91 when the fastener is driven into an object. The wall 91 should be as thin as possible, to save material and facilitate breakability, but thick enough that it remains intact when one pin is stripped from the strip by the driver blade.

In the preferred embodiment illustrated in FIG. 8, there are four fragmentable tabs configured in the shape of a cross. Other configurations for the lower portion 78 are also possible, and would be apparent to persons skilled in the art. For instance, there may be a greater or fewer number of fragmentable tabs, or the lower portion 78 may have a different shape entirely. However, an important feature of the lower portion 78 is that, regardless of its configuration, it fragments and separates when the fastener 60 is driven into an object.

When the power driving tool injects a fastener 60 into an object, the bridges 52 and 54 between the leading carrier sleeve 72 and the next adjacent sleeve are sheared as explained above with respect to the drawings. Then, referring to FIGS. 1 and 2, as the fastener pin 60 is driven into the object, the upper collar 74 of the sleeve 72 will fragment and break away due to separation of the recesses 51 and 53. As the fastener pin 60 further penetrates the object, the lower collar 78 will fragment and break away as the tabs 81, 83, 85 and 87 fragment and separate due to breakage of the wall 91.

The fastener 60 continues to penetrate the object until the head 62 becomes firmly engaged against the upper surface of the object. The outward force exerted by the fastener head 62 as it passes through the sleeve 72, causes complete fragmentation and scattering of the sleeve 72 so that no portion of the sleeve enters the object with the fastener, or remains wedged between the object and the fastener head.

As illustrated in FIG. 1, it is preferred that a distance be maintained between the head portion 62 of the fastener 60 and the upper collar 74 of the sleeve 72, prior to installation of the fastener 60 into an object. This distance may be at least about 0.105 inches for a pin having a length of about 0.75 inches or longer, and may be at least about 0.60 inches for a pin having a length of about 0.50 inches to less than about 0.75 inches. The purpose for maximizing this length is to minimize the distance between the head portion 62 of the fastener 60 and the top wall of a magazine holder which carries the pins prior to installation.

Figure 10:
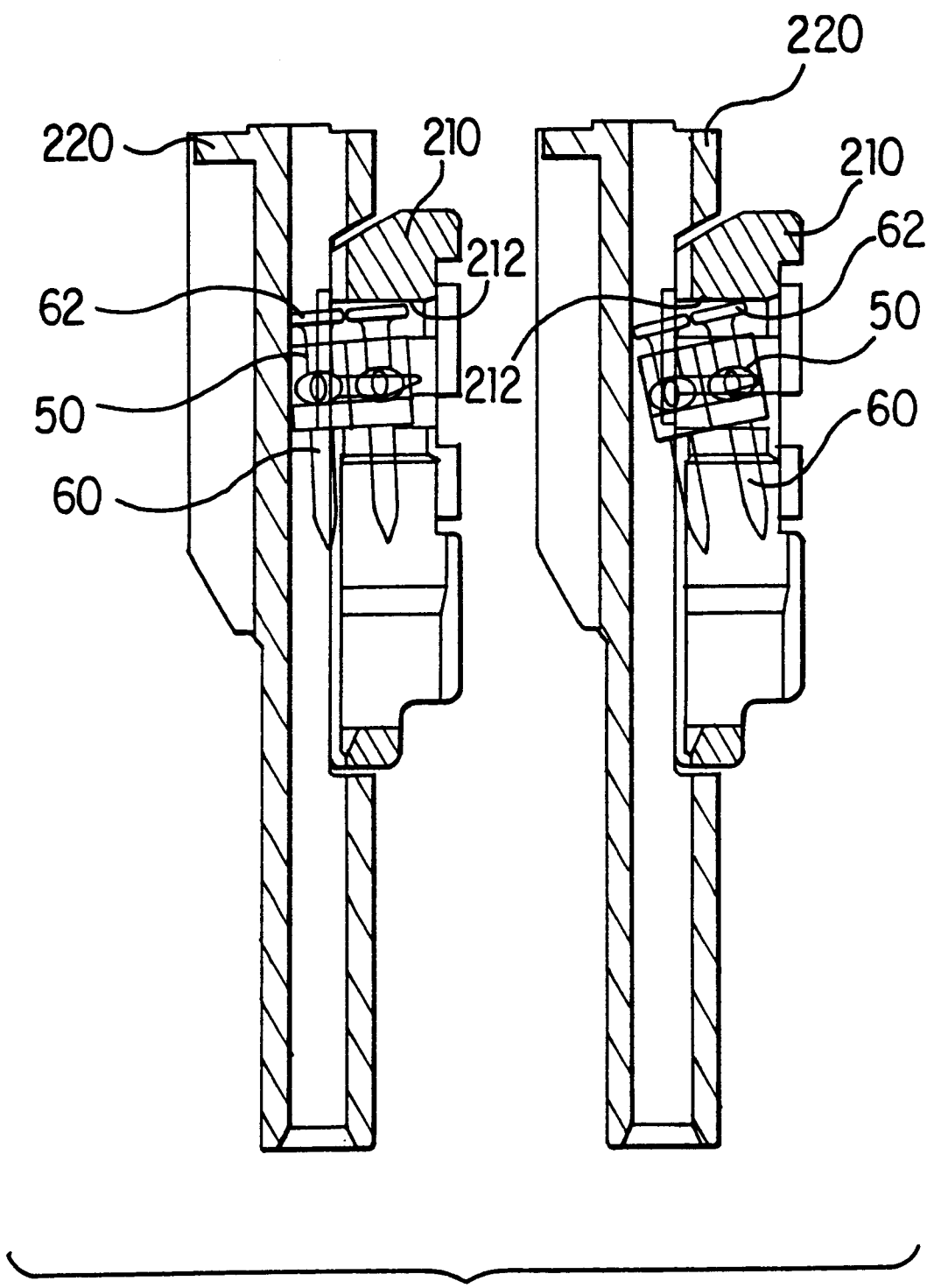
FIG. 10 is a sectional view of the embodiments of a fastener assembly in combination with a magazine holder used for installation of the fasteners into an object.

FIG. 10 shows, in cross-section, two embodiments of a fastener assembly 50 carried inside a magazine holder 210 of a typical fastener driving tool. As the individual fasteners are used, the fastener assembly passes from right to left in the magazine holder 210. The pins are separated one by one using a piston driver blade (not shown) and are passed through a bore 220 into an object below. As shown in the right hand side of FIG. 10, especially when firing the next-to-last pin of any strip, the fastener assembly 50 may become angled or "cocked," causing interference with the installation process, if the distance between the head 62 of the pin and the inner wall 212 at the top of the magazine holder 210 (also known as the shear block) is too large. As shown in the left hand side of FIG. 10, the angling problem can be reduced or eliminated by minimizing the distance between the head portion 62 of the fastener 60 and the top inner wall 212 of the magazine holder 210. Suitably, this distance should be less than about 0.010 inches, preferably less than about 0.008 inches, more preferably less than about 0.005 inches.

Sometimes it is difficult to consistently position the carrier collation 70 at the optimum distance below the head portions 62 of fasteners 60. This can lead to rocking of the fastener assembly 50 inside the bore 210 (also called the shear block) and the magazine holder, especially when the last few fasteners are being fired by the driving tool. In order to remedy this, an arcuate extension can be formed at one or both ends of the carrier collation, as shown in FIGS. 11–14.

Figure 13:
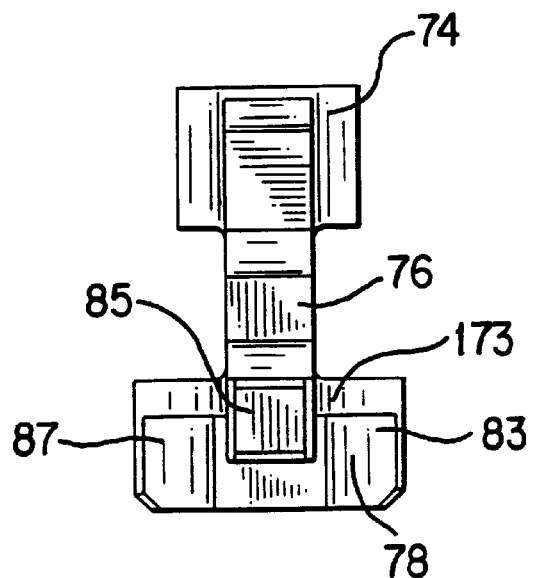
FIG. 13 is an end view showing the right hand end of the carrier assembly of FIG. 11.
Figure 14:
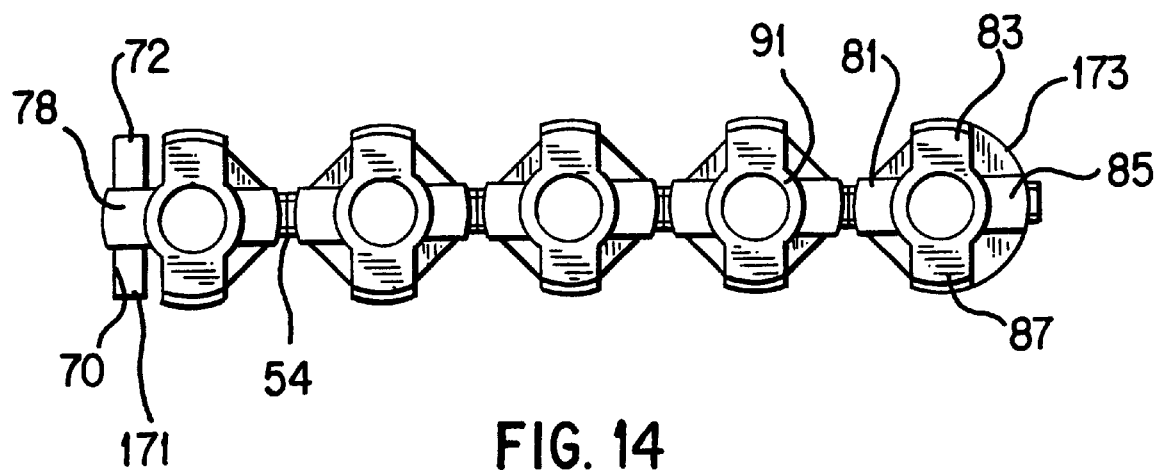
FIG. 14 is a bottom view of the carrier assembly of FIG. 11.

The carrier collation 70 an FIGS. 11–14 is similar to the carrier collation 70 described above, except for the presence of lateral end extensions 171 and 173 at both ends thereof. The same reference numerals are used in FIGS. 11–14 to designate the parts already described. As shown in FIGS. 11–14, the lateral end extensions 171 and 173 may have different shapes. The arcuate configuration, shown at the right hand side of FIGS. 11 and 14, is presently preferred due to ease of molding. The lateral end extensions may also have a tabular (for example, rectangular) configuration as shown at the left hand side of FIGS. 11 and 14. Other configurations are also possible for the lateral end extensions 171 and 173. Preferably, the lateral extensions at both ends have the same configuration. In FIGS. 11 and 14, they are different only for ease of illustration.

The lateral end extensions 171 and 173 may extend from the upper tab 83 to the lower tab 87, or alternatively may not intersect tabs 83 and 87. The extension 171 may intersect the left tab 81 of the sleeve 72 on the left hand end of the carrier collation 70. The extension 173 may intersect the right tab 85 of the sleeve 72 on the right hand end of the carrier collation 70. In other words, the extensions 171 and 173 are present at the outboard ends of first and last of the sleeves 72 in the carrier collation 70, and extend laterally (i.e. up and down in the drawings) from both ends. Also, the lateral end extensions 171 and 173 are present on the lower portions 78 of the carrier sleeves 72.

A lateral end extension need be present only at the end sleeve of the carrier 70 which is the last to be fired out of the driving tool. The lateral end extension helps to balance and stabilize the fastener assembly 50 inside the shear block and magazine holder, particularly when only one or a few fasteners remain to be fired. The lateral end extension engages ribs (not shown) in the shearing block so as to prevent rocking of the fastener assembly 50 during firing of the last few fasteners. Preferably, the lateral end extensions are formed at both ends of the carrier collation 70. This way, the carrier collation 70 remains symmetrical, and either end of the fastener assembly 50 can be inserted first into the magazine holder when the driving tool is being loaded.

As shown in FIGS. 12 and 12a–12d, each end sleeve 72 in the carrier collation 70 is identical to the adjacent sleeve 72, second from the end, except for the presence of the lateral end extension (171 or 173) in the end sleeve. Also, the end sleeve is similar to the adjacent sleeve in every region except for the lower portion 78 containing the lateral end extension. For instance, the upper portions 74 of the adjacent sleeves are identical, as are the middle wall portions 76 (FIGS. 12a and 12b). The lower portions 78 differ in that the lateral end extension 173 is present on the end sleeve but not the adjacent sleeve (FIG. 12c). The lower flanges 79 of the adjacent sleeves are identical (12d).

Referring to FIG. 13, the height or thickness of the lateral end extension 173 need not be as great as the heights or thicknesses of the side tabs 83 and 87 to which it connects, or of the end tab 85 through which it passes. Instead, the height or thickness of the lateral end extension 173 (and of the lateral end extension 171 at the opposite end of the carrier collation) need only be sufficient to communicate with the walls in the shearing block, so as to balance and stabilize the fastener assembly 50 during firing of the last few fasteners. In the preferred embodiment illustrated in FIG. 12c, the radius of the arcuate extension 173 is sufficient so that, in cross section, the arcuate extension 173 forms a continuous semi-circle with the side tabs 83 and 87.

In order to ensure that sleeve 72 will fragment and break away as intended, so as not to leave tails, the proper selection of a material for molding the carrier 70 is an important aspect of the invention. The carrier must be composed of a material that is relatively hard and brittle, and which has a greater tendency to fracture and break than to bend when subjected to a driving force. Yet, as explained above, the carrier material must also be strong enough to maintain the integrity of the nail assembly 50 during normal handling and use, and must be able to be separated by the driver blade in the magazine.

The inventors have learned that the foregoing properties can be obtained by combining a stiff polyolefin material with a particulate filler, and blending them together to form a substantially homogeneous mixture. The stiff polyolefin should have a density greater than about 0.900 grams/cm$^3$, preferably greater than about 0.925 grams/cm$^3$, more preferably greater than about 0.945 grams/cm .$^3$ Stiff polyolefin materials include high density polyethylene (i.e., having a density of 0.945 g/cc or greater), medium density polyethylene (i.e., having a density of 0.925–0.945 g/cc), linear low density polyethylene (i.e., linear copolymers of ethylene with up to 10% by weight of an alpha-olefin having 3–12 carbon atoms and having a density of 0.910–0.925 g/cc), and combinations thereof. Of these, the most preferred stiff polyolefin is high density polyethylene.

Particulate fillers can be inorganic or organic and include, but are not limited to, talc, alumina, graphite, clay powder, glass spheres, silica, titania, wood flour, calcium carbonate, polytetrafluoroethylene powder, barium sulfate, and mixtures including one or more of these. Talc powder is the presently preferred filler. Talc generally has the chemical formula $Mg_3Si_4O_{10}(OH)_2$. The particulate filler can constitute about 1.25% by weight of the total carrier composition (polyolefin mixed with filler), preferably about 3–10% by weight, more preferably about 4–7% by weight. In a presently preferred embodiment, the carrier composition comprises about 5% by weight talc and about 95% by weight high density polyethylene. Higher filler loads generally cause increased brittleness and ease of fracturing. If the amount of filler is too low, the sleeve is difficult to fracture and will often not separate from the fastener pin during installation.

The particle size of the filler is not especially important, provided that the proper balance of strength, brittleness and breakability of the carrier can be achieved. Generally, the filler will have an average particle diameter of about 0.1–250 microns, more commonly about 10–150 microns. In one embodiment, talc filler is present in the form of particles of masterbatch consisting of 80% talc and 20% polypropylene, the particles having an average diameter of about 100 microns. The carrier 70 is typically manufactured using a molding process, such as an injection molding process. A wide variety of filler sizes and types can be employed with polyolefins in these molding processes.

While the embodiments of the invention described herein are presently considered to be preferred, various modifications and improvements can be made without departing from the spirit and scope of the invention. The scope of the invention is indicated in the appended claims, and changes that fall within the meaning and range of equivalency are intended to be embraced therein.

We claim:

1. A fastener assembly, comprising:
   a plurality of fasteners arranged in a row; and
   a carrier including a plurality of connected carrier sleeves for maintaining the fasteners in position, the connected carrier sleeves including two end carrier sleeves;
   at least one of the end carrier sleeves comprising a lateral end extension on an outboard end thereof, the lateral end extension having an arcuate configuration;
   wherein the carrier comprises a mixture including a polyolefin material having a density greater than about 0.900 grams/cm$^3$, and a particulate filler.

2. The fastener assembly of claim 1, wherein each of the end carrier sleeves comprises a lateral end extension on an outboard end thereof.

3. The fastener assembly of claim 1, wherein the lateral end extension is present in a lower portion of the end carrier sleeve.

4. The fastener assembly of claim 1, wherein the lateral end extension has a arcuate configuration.

5. The fastener assembly of claim 1, wherein the polyolefin material comprises high density polyethylene.

6. The fastener assembly of claim 1, wherein the polyolefin material has a density greater than about 0.945 grams/cm$^3$.

7. The fastener assembly of claim 1, wherein the particulate filler constitutes about 1–25% by weight of the carrier.

8. The fastener assembly of claim 1, wherein the particulate filler constitutes about 3–10% by weight of the carrier.

9. The fastener assembly of claim 1, wherein the filler comprises talc.

10. A fastener assembly, comprising:
    a plurality of fasteners arranged in a row, each fastener including a head and an elongated shank; and
    a carrier including a plurality of connected carrier sleeves receiving and surrounding a portion of each fastener;
    the carrier sleeves including two end carrier sleeves;
    each of the carrier sleeves including an upper breakable portion, a middle wall portion and a lower breakable portion;
    at least one of the end carrier sleeves further including a lateral end extension in the lower breakable portion thereof.

11. The fastener assembly of claim 10, wherein each of the end sleeves includes a lateral end extension in the lower breakable portion thereof.

12. The fastener assembly of claim 10, wherein the lateral end extension has an arcuate configuration.

13. The fastener assembly of claim 10, wherein the lateral end extension has a rectangular configuration.

14. The fastener assembly of claim 10, wherein the upper breakable portion comprises a generally annular interior cross-section corresponding substantially to an outer diameter of the elongated shank of a fastener.

15. The fastener assembly of claim 10, wherein the lower breakable portion comprises a plurality of fragmentable tabs, and the lateral end extension intersects at least one of the tabs.

16. The fastener assembly of claim 15, wherein the lateral end extension extends in both lateral directions from the tab it intersects.

17. The fastener assembly of claim 15, wherein the lateral end extension defines a semi-circle which commences and terminates at outer edges of two of the tabs.

18. The fastener assembly of claim 15, wherein the lateral end extension is thinner than the tab which it intersects.

19. The fastener assembly of claim 10, wherein the lower breakable collar comprises a generally annular interior cross-section corresponding substantially to an outer diameter of the elongated shank of a fastener.

20. The fastener assembly of claim 10, wherein the lower breakable collar comprises a plurality of fragmentable tabs joined to a wall which is structurally thinner and weaker than the tabs.

21. The fastener assembly of claim 20, comprising four of the tabs arranged in a cross.

22. The fastener assembly of claim 20, wherein the lateral end extension comprises a rectangular extension which extends laterally from one of the tabs.

23. The fastener assembly of claim 20, wherein the lateral end extension comprises an arcuate extension which passes through one of the tabs.

24. The fastener assembly of claim 21, wherein two of the tabs are offset relative to the other two tabs.

25. A fastener assembly, comprising:
    a plurality of fasteners arranged adjacent to one another, each fastener including a head and an elongated shank; and
    a carrier including a plurality of adjacent connected carrier sleeves for holding the fasteners, the carrier sleeves including two end carrier sleeves;
    each carrier sleeve including an upper breakable collar, a middle wall portion, and a lower breakable collar including a plurality of laterally extending fragmentable tabs;
    each of the end carrier sleeves further including a lateral end extension intersecting at least one of the tabs.

26. The fastener assembly of claim 25, wherein the lower portion comprises four of the laterally extending tabs, and a breakable wall joined to the tabs.

27. The fastener assembly of claim 25, wherein the lateral end extension comprises an arcuate extension which commences at one of the tabs and terminates at another of the tabs.

28. The fastener assembly of claim 25, wherein the lateral end extension comprises a rectangular extension which extends laterally from the intersecting tab.

29. The fastener assembly of claim 26, wherein the four tabs are arranged in a cross, and the lateral end extension is semi-circular.

30. The fastener assembly of claim 25, wherein the lateral end extension commences at one tab, passes through a second tab, and terminates at a third tab.

31. The fastener assembly of claim 25, wherein the lateral end extension intersects only one tab.

32. The fastener assembly of claim 25, wherein the lateral end extension is thinner than the intersecting tab.

* * * * *